United States Patent
Boucheron et al.

(10) Patent No.: US 12,388,670 B2
(45) Date of Patent: Aug. 12, 2025

(54) SCHEDULE A MEETING FROM A CHAT CHANNEL

(71) Applicant: Zoom Video Communications, Inc., San Jose, CA (US)

(72) Inventors: Cecile Boucheron, Brooklyn, NY (US); Ganna Isayeva, Odessa, FL (US); Minzhe Jiang, Hangzhou (CN); Youjin Jang, San Ramon, CA (US); Sharvari Nerurkar, Redmond, WA (US); Archil Vardidze, Austin, TX (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/899,142

(22) Filed: Aug. 30, 2022

(65) Prior Publication Data

US 2023/0246862 A1 Aug. 3, 2023

Related U.S. Application Data

(63) Continuation of application No. PCT/CN2022/075247, filed on Jan. 30, 2022.

(51) Int. Cl.
*H04L 12/18* (2006.01)
*H04L 51/046* (2022.01)

(52) U.S. Cl.
CPC ........ *H04L 12/1818* (2013.01); *H04L 51/046* (2013.01)

(58) Field of Classification Search
CPC .................. H04L 12/1818; H04L 51/046
See application file for complete search history.

(56) References Cited

U.S. PATENT DOCUMENTS

| 8,346,590 B2 * | 1/2013 | Norton ............... G06Q 10/1095 705/7.18 |
| 2018/0123814 A1 * | 5/2018 | Sexauer .............. H04L 12/1818 |

(Continued)

OTHER PUBLICATIONS

Cornell, "How to Set Up a Facebook Messenger Rooms Video Call", Available Online at: https://www.howtogeek.com/673227/how-to-set-up-a-facebook-messenger-rooms-video-call/, May 17, 2020, 14 pages.

(Continued)

*Primary Examiner* — Nazia Naoreen
(74) *Attorney, Agent, or Firm* — Kilpatrick Townsend & Stockton LLP

(57) ABSTRACT

A system is disclosed, with a non-transitory computer-readable medium; a communications interface; and a processor communicatively coupled to the non-transitory computer-readable medium and the communication interface, the processor configured to execute processor executable instructions stored in the non-transitory computer-readable medium. The instructions may cause the processor to receive, from a first client device via a chat channel, a request to schedule a video conference. The chat channel may be configured to enable one or more users to exchanges messages using a respective client device. The processor may further determine a meeting time for the video conference based on one or more parameters associated with a set of users having access to the chat channel. The processor may further schedule the video conference based on the meeting time. The processor may further post, within the chat channel, a meeting notification, where the meeting notification includes a link to the video conference.

20 Claims, 10 Drawing Sheets

(56) References Cited

U.S. PATENT DOCUMENTS

| | | | |
|---|---|---|---|
| 2020/0052921 A1* | 2/2020 | van Rensburg | H04L 12/1818 |
| 2020/0274726 A1* | 8/2020 | Setteboun | G06F 3/04817 |
| 2023/0068117 A1* | 3/2023 | Johnston | H04L 65/403 |
| 2023/0136777 A1* | 5/2023 | Kotnis | H04L 12/1818 |
| | | | 709/204 |
| 2023/0208898 A1* | 6/2023 | Deng | G06Q 10/06393 |
| | | | 709/204 |

OTHER PUBLICATIONS

PCT/CN2022/075247, "International Search Report and Written Opinion", May 6, 2022, 12 pages.
Sulleyman, "How to use Messenger Rooms, Facebook's New Video Calling Feature", Available Online at: https://www.trustedreviews.com/how-to/use-messenger-rooms-4033465, May 21, 2020, 7 pages.

* cited by examiner

SCHEDULE A MEETING FROM A CHAT CHANNEL

CROSS-REFERENCE

This application is a continuation of PCT Application No. PCT/CN2022/075247, filed Jan. 30, 2022, titled "Schedule a Meeting from a Chat Channel," the entirety of which is hereby incorporated by reference.

BACKGROUND

The present application relates generally to chat channels and various functions therein, and more particularly scheduling a video conference from within a chat channel.

DETAILED DESCRIPTION OF THE INVENTION

Examples are described herein in the context of video messaging. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another Platforms capable of allowing participants to send messages between each other continue to grow in popularity. Companies have dedicated platforms that allow participants to send and receive messages, or chat, with other participants to increase productivity and communication, as well as provide for social interaction. Schools and universities may use similar platforms for similar purposes. Some platforms may be used purely socially, or for gaming, or some other purpose; chat platforms proliferate modern interaction.

A chat platform may provide multiple chat channels, organized by groups of participants that may access the chat channel. For example, a company may have multiple teams working on different tasks. Each team may have its own associated chat channel. A participant may be a member of multiple chat channels, if the participant is a member of multiple teams, for example. While chats can provide quick communication between members of the chat channel, the quick, text-based style of most chat platforms may not be the most effective method of communication in all cases.

For example, a participant may wish to schedule a meeting (or "video conference") with all of the members of a chat channel. With any number of participants capable of being joined to a chat channel, and therefore an equal number of calendars to account for, scheduling such a meeting may be difficult. Further, scheduling a meeting with all participants within a chat channel may require leaving the chat channel, hindering productivity. Systems and methods disclosed herein may allow for the meetings to be scheduled within a chat channel, thus overcoming these issues.

Figure 1:
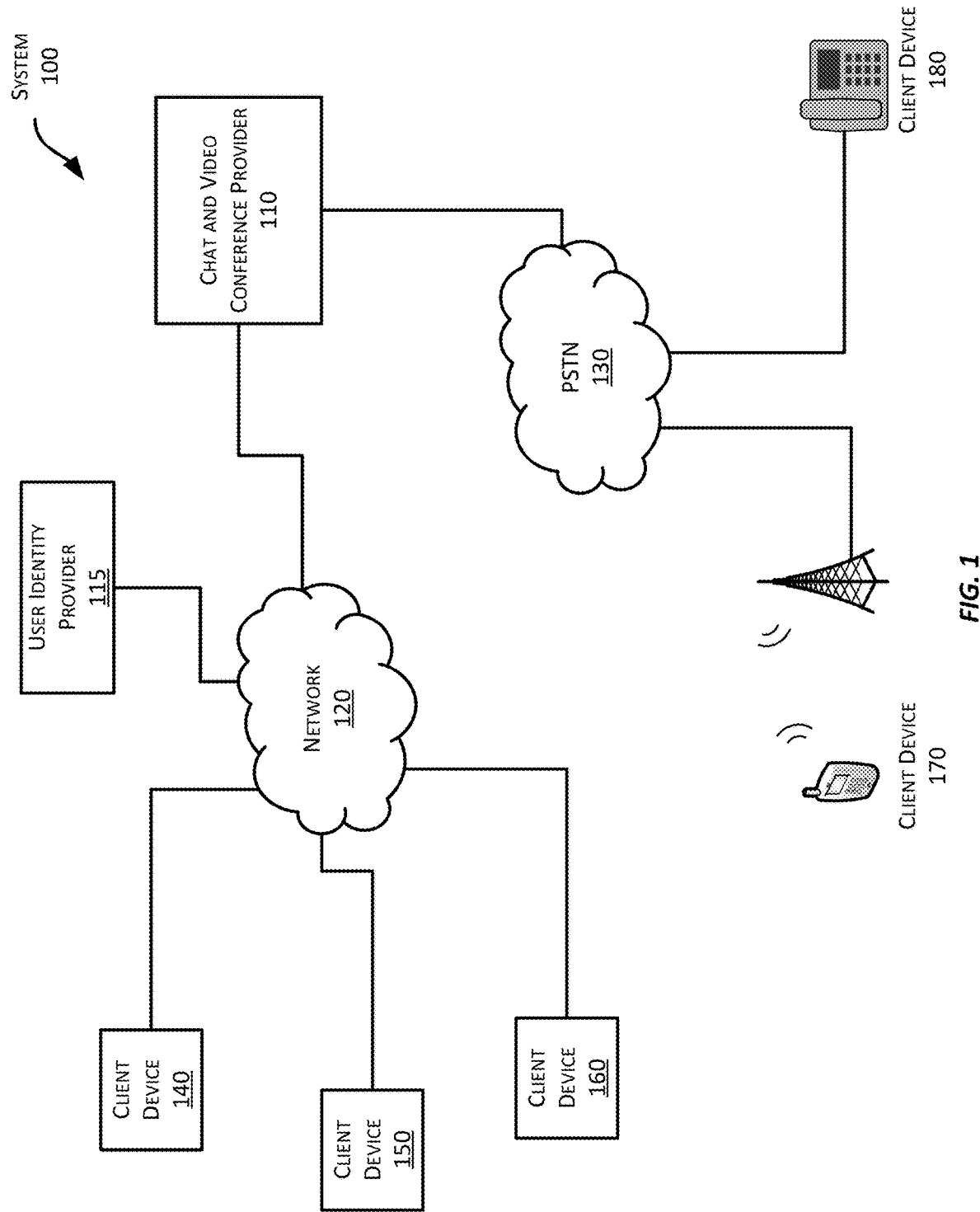
FIG. 1 shows an example system 100 that provides videoconferencing and chat functionality to various client devices, according to certain examples.

FIG. 1 shows an example system 100 that provides videoconferencing and chat functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

It should be understood that in example examples, the chat and video conference provider 110 may be a chat provider 110 providing only a chat functionality, while in other example examples, the chat and video conference provider 110 may be a video conference provider 110 providing only video conferencing functionality. Furthermore, although the chat and video conference provider 110 are shown as one entity, other configurations are considered. For example, a chat provider may have a structure similar to that of chat and video conference provider 110, and a video conference provider may also have a structure similar to the chat and video conference provider 110. The chat provider and the video conference provider may be connected through the same network (e.g., the network 120), or may be operable to communicate with each other through another shared network.

The system optionally also includes one or more user identity providers, e.g., user identity provider 115, which can provide user identity services to users of the client devices 140-160 and may authenticate user identities of one or more users to the chat and video conference provider 110.

In this example, the user identity provider 115 is operated by a different entity than the chat and video conference provider 110, though in some examples, they may be the same entity.

In some examples, the chat and video conference provider 110 may provide a chat functionality. In such examples, the chat and video conference provider 110 may allow a user to create one or more chat channels where the user may exchange messages with other users that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 110 may provide permission to a user and/or an owner of the chat channel may provide permission to the user. Furthermore, there may be any number of users permitted in the chat channel.

Figure 2:
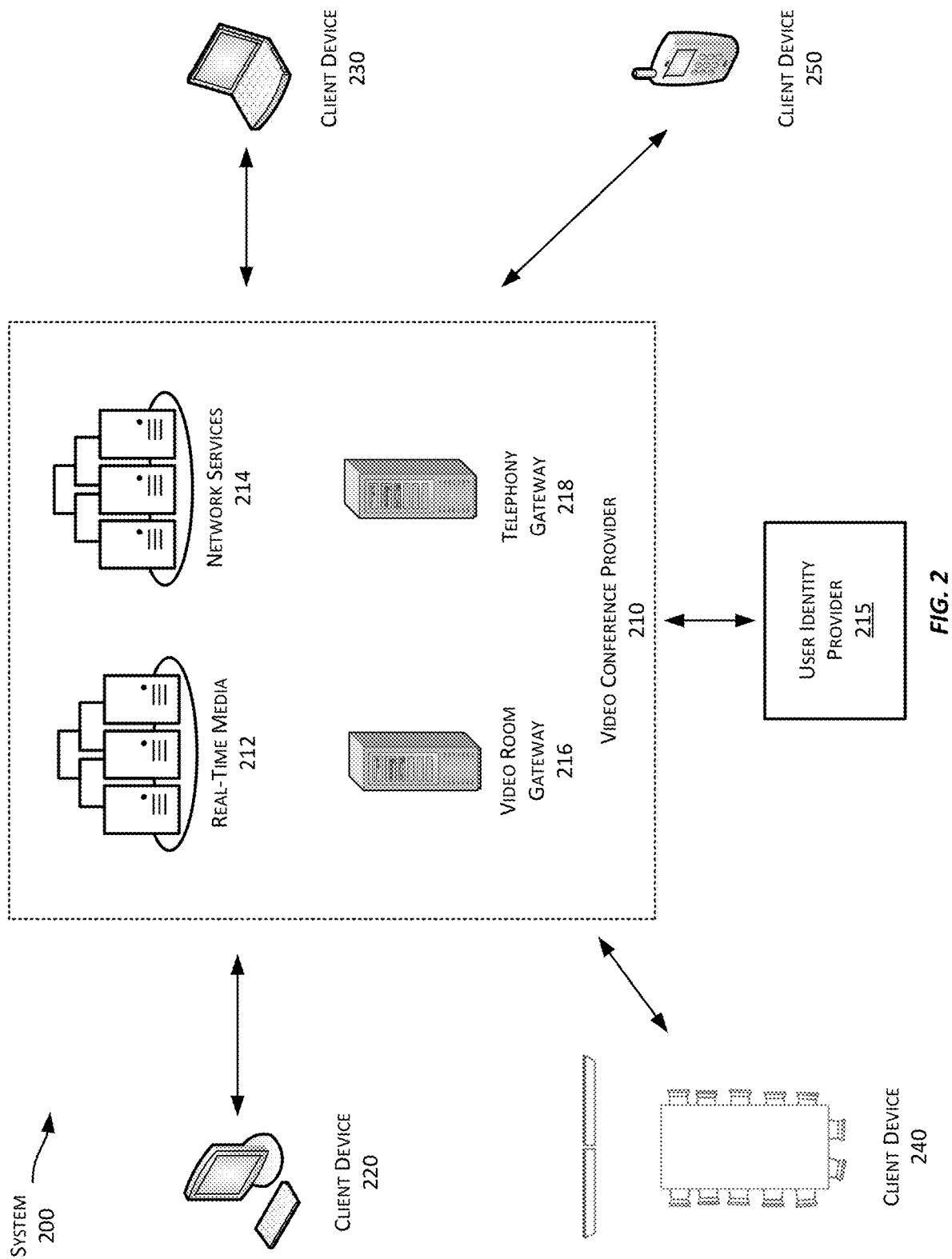
FIG. 2 shows an example system in which a chat and video conferences provider provides chat and videoconferencing functionality to various client devices, according to certain examples.

The chat and video conference provider 110 may also provide video conferencing functionality. For example, the chat and video conference provider 110 may allow clients to create videoconference meetings (or "meetings") and invite others to participate in those meetings as well as perform other related functionality, such as recording the meetings, generating transcripts from meeting audio, manage user functionality in the meetings, enable text messaging during the meetings, etc. FIG. 2, described below, provides a more detailed description of the architecture and functionality of the chat and video conference provider 110.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

Chat channels may be provided by the chat and video conference provider 110 to which participants are connected. Similar to the meetings discussed above, the chat channels are constructs provided by a server where the messages are received then directed to the various participants. The messages may include text, audio files, video files, image files, or any other electronic file type.

To create a meeting with the chat and video conference provider 110, a user may contact the chat and video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider 110 may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The chat and video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the chat and video conference provider 110. They also receive audio or video information from the chat and video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The chat and video conference provider 110 may also invalidate the meeting information, such as the meeting identifier or password/passcode.

The chat and video conference provider 110 may use a similar process as is used to create a meeting to create a chat channel. A user may contact the chat and video conference provider 110 using a client device 140-180 and select an option to create a chat channel. Such an option may be provided in a webpage accessed by a client device 140-160 or client application executed by a client device 140-160. To create the chat channel, the chat and video conference provider 110 may prompt the user for certain information, a number of participants, a type of encryption to use, whether the chat channel is confidential or open to anyone, a title or subject, etc. After receiving the various chat channel settings, the chat and video conference provider may create a record for the chat channel and generate a chat identifier to one or more user invited to the chat channel. In some examples, the certain information associated with the chat channel may be automatically generated by the chat and video conference provider 110.

To provide such functionality, one or more client devices 140-180 may communicate with the chat and video conference provider 110 using one or more communication networks, such as network 120 or the PSTN 130. The client devices 140-180 may be any suitable computing or communications device that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any LAN, MAN, WAN, cellular network (e.g., 3G, 4G, 4G LTE, 5G, etc.), or any combination of these. Other types of computing devices may be used instead or as well, such as tablets and/or smartphones.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings/chat channels or join existing meetings/chat channels. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak or share content in a meeting or chat, hear or view certain content shared in the meeting, or access other meeting functionality.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective chat and/or video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of chat and/or video conference functionality, thereby enabling the various client devices to create and participate in chat channels and/or video conference meetings. The chat and video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more chat channels and/or video conference meetings to the client devices 220-250.

The real-time media servers 212 provide multiplexed multimedia streams to meeting participants, such as the client devices 220-250 shown in FIG. 2. While chat and/or video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various chat and/or video and audio streams based on the target client device and communicate multiplexed streams to each client device. For example, the real-time media servers 212 receive chat and/or audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the chat and/or audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the chat and video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the chat and video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

The chat and video conference provider 210 may use a similar process to that which is used to schedule a meeting (as described above) to create a chat channel. A user may contact the chat and video conference provider 210 using a client device 220 and select an option to create a chat channel. After receiving various chat channel settings (e.g. a title, a participant list, etc.), the chat and video conference provider may create a record for the chat channel and generate a chat identifier to invite one or more users to the chat channel. In some examples, the certain information associated with the chat channel may be automatically generated by the chat and video conference provider 210.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting and/or a chat channel, client devices will send and receive multimedia streams via the real-time media servers 212, but they may also communicate with the network services servers 214 as needed during meetings. For example, if the host leaves the meeting or chat channel, the network services server(s) 214 may appoint another user as the new meeting host and assign host administrative privileges to that user. Hosts may have administrative privileges to allow them to manage their chat channels and/or meetings, such as by enabling or disabling screen sharing, muting or removing users from the meeting, assigning or moving users to the chat channel or meeting, recording meetings, etc. Such functionality may be managed by the network services server(s) 214.

For example, if a host wishes to remove a user from a chat channel, they may identify the user and issue a command through a user interface on their client device. The command may be sent to a network services server 214, which may then disconnect the identified user from the corresponding real-time media server 212. If the host wishes to move one or more participants into a meeting or chat channel, such a command may also be handled by a network services server 214, which may provide authentication information to the one or more participants for joining the chat channel and then connect the one or more participants to the chat channel. In some examples, a chat channel may not have a host.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting and deactivate, e.g., by deleting a corresponding passcode for the meeting from the meeting record, or delete the meeting record(s) corresponding to the meeting. Thus, if a user later attempts to access the meeting, the network services server(s) 214 may deny the request. Similar steps may be taken for ending an chat channel. For example, after receiving a command to terminate a chat channel, the network services server 214 communicate with the real time media server(s) 212 to stop a messaging service for the chat channel and remove any users from the chat channel records.

Depending on the functionality provided by the chat and video conference provider, the network services server(s) 214 may provide additional functionality, such as by providing private chat and meeting capabilities for organizations, special types of meetings (e.g., webinars), etc.

Such functionality may be provided according to various examples of chat and video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive chat and/or video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosed by the chat and video conference provider 210. Because telephony devices communicate using the PSTN and not using computer networking protocols, such as TCP/IP, the telephony gateway servers 218 act as an interface that converts between the PSTN and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some chat and video conference providers may provide more or less functionality than described above and may not separate functionality into different types of servers as discussed above. Instead, any suitable servers and network architectures may be used according to different examples.

Figure 3:
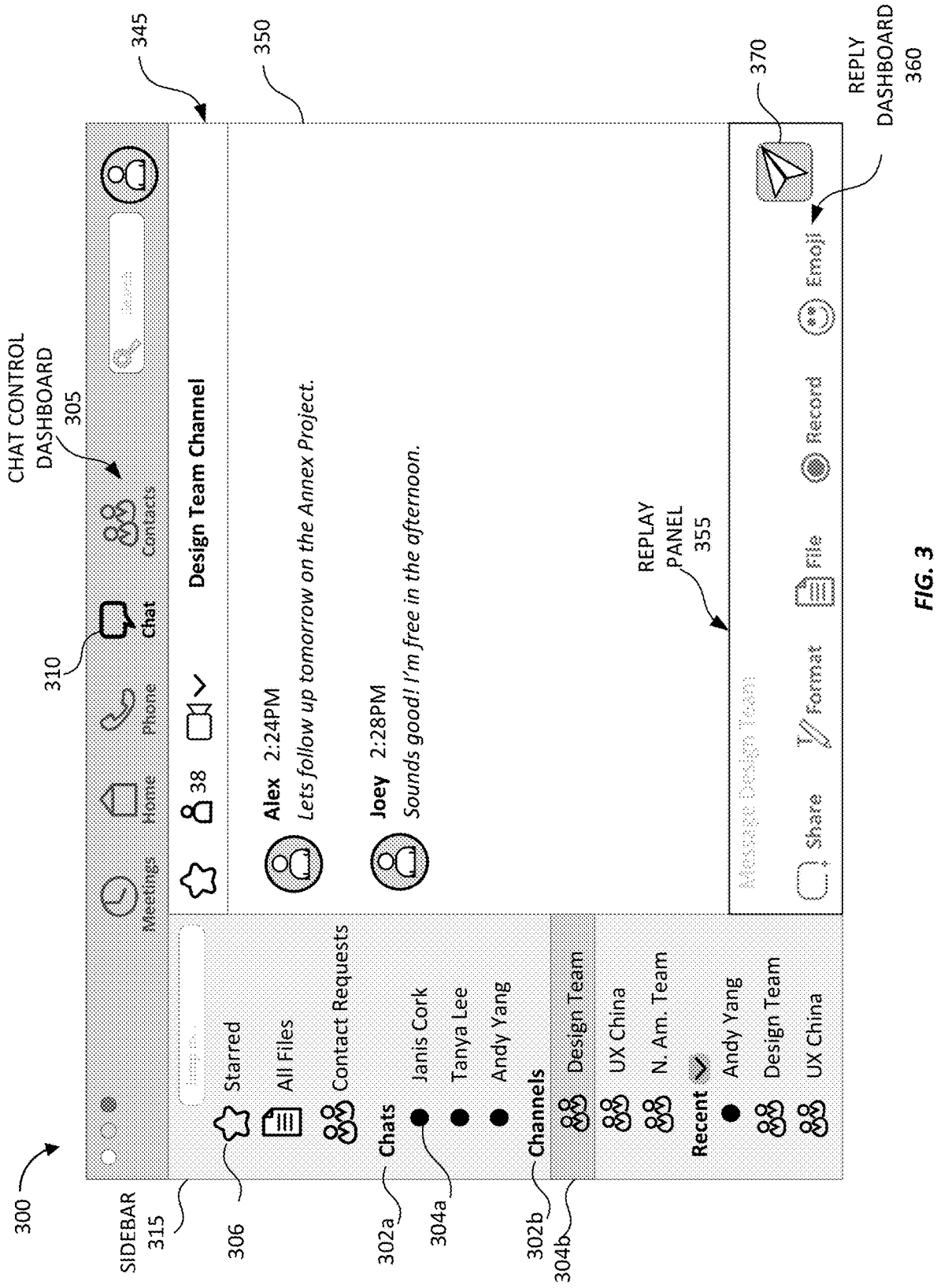
FIG. 3 shows a master chat panel, according to certain examples.

FIG. 3 shows a master chat panel 300 according to certain examples. The master chat panel 300 may be displayed on a client device in response to information sent by a chat and video conference provider, such as the chat and video conference provider 110 in FIG. 1. The master chat panel may be generated by an application run by one or more processors stored on the client device. The client device may be a personal computer such as a desktop or laptop, a mobile device, or other computing device having at least a processor, non-transitory memory, a user input system, and communication interface, providing network connectivity.

The master chat panel 300 may include a general dashboard 305, a chat control dashboard 345, a sidebar 315, a chat window 350, a reply dashboard 360, and a reply panel 355. The general dashboard 305 may include one or more buttons or links that switch functionalities and/or views of the master chat panel 300. For example, FIG. 3 shows a chat view, perhaps in response to a user command selecting a chat button 310 in the chat control dashboard 345. In this view, the chat window 350, the reply panel 355, and other components illustrated in FIG. 3 may be displayed on the client device. In other examples, a user may select a contacts button. In response the contacts button being selected, the reply window 350, the reply dashboard 360 and the reply panel 355 may be replaced by a display a contacts window including a list of user contacts associated with the user of the client device. The sidebar 315 may be displayed alongside the contacts window. Other configurations are also possible. Various buttons on the chat control dashboard 345 may correspond to various displays of windows being displayed on the client device. Any number of components shown in FIG. 3 may be displayed on the client device with any of the various windows. Similarly, any of the components may cease to be displayed in accordance with any of the windows.

The sidebar 315 may include one or more chat channel headings. A chat heading 302a may include one or more chat channels such as the chat channel 304a. In some examples, the chat channel 304a may include a private chat, where the chat is between the user associated with the client device and another user. Messages sent and received via the chat channel 304a may only be accessed by the users in the chat channel 304a. Thus, the client devices associated with the user and the client device associated with the other user may securely communicate with each other.

A chat channel heading 302b may include a chat channel 304b. The chat channel 304b may by a group chat, where two or more users have access to send and receive messages within the chat channel. In some examples, the chat channel 304b may only be accessed by users who have permission to enter the chat channel. A host of the chat channel 304b and/or the video chat and video conference provider may grant access to the chat channel 304b. Although only the chat channel headings 302a-b are shown, other chat channel headings are possible. For example, some examples may include a chat channel heading that displays, on the client device, only those channels that the user associated with the client device is a member of that have been recently accessed. "Recently accessed" may be determined by the client device to be a fixed number of most recent channels accessed by the user, or may be only those channels access within a certain time, calculated from the current time.

The sidebar 315 may also include one or more combinatory headings, such as starred combinatory heading 306. A combinatory heading may aggregate one or more messages from one or more chat channel, according to one or more predetermined criteria. The combinatory headings may include a link that, in response to a user command, cause the client device to display messages in the chat window 350. The messages may be gathered from one or more chat channels, such as the chat channel 304a-b, and displayed based on a predetermined criteria. In FIG. 3, for example, the starred combinatory heading 306 may gather only those messages that have been marked by a user of the client device. The marked messages may be stored at the client device, and/or may be stored at the chat and video conference provider. The link may cause the one or more processors included on the client device to determine which messages are marked messages and cause them to be displayed in the chat window 350. In some examples, the link may cause the client device to send a signal to the chat and video conference provider. The chat and video conference provider may then determine which messages are marked messages and send information to the client device to generate a display of the marked messages in the chat window 350.

Other combinatory headings (and associated links and functionality) are also considered. Other examples may include an unread heading, an all files heading, a contact request heading, and others. As with the starred combinatory heading 306, an associated link may cause the client device and/or the chat and video conference provider to determine which messages (if any) meet predetermined criteria associated with the combinatory heading and subsequently display those messages on the client device.

The chat control dashboard 345 may display one or more control buttons and/or information regarding the chat channel currently being displayed on the client device. The control buttons may include links that mark a message (e.g. to mark it such that it is determined to be a marked message via the starred combinatory heading 306), begin a video conference, schedule a meeting, or other tasks. The chat control dashboard may also include a title of the chat channel currently being displayed on the client device and/or a number of users with access to the chat channel. One of ordinary skill in the art would recognize many different possibilities and configurations.

The reply panel 355 may include an input field, where the user may cause the client device to send a message to the chat channel. The input field may be accessed by a peripheral device such as a mouse, a keyboard, a stylus, or any other suitable input method. In some examples, the input field may be accessed by a touchscreen or other system built into the client device. In some examples, a notification may be sent from the client device and/or the video conference provider that indicates a response is being entered in to the input field by the user. In other examples, no notification may be sent.

The reply dashboard 360 may include one or more buttons that, in response to a user command edit or modify a response input into the input field. For example, a record button may be provided, that allows the client device to capture audio and video). In other examples, there may be a share button that causes the client device to send the message to a different chat channel. In yet another example, there may be a reaction button which causes an image to be sent by the client device to the chat channel in response to a message posted in the chat channel.

In some examples, there may be one or more formatting buttons included on the reply dashboard 360. The one or more formatting buttons may change the appearance of a replay entered in the input field. The user may thereby edit and customize their response in the input field before sending.

The reply dashboard 360 may include a send button 370. The send button 370 may, in response to a user command, cause the client device to send the contents of the input field (or "response") to the chat channel. The client device may then send the response to the chat and video conference provider. The chat and video conference provider may then send the response to the chat channel. The response may include image files such as JPEG, PNG, TIFF, or files in any other suitable format. The response may also include video files such as MPEG, GIF, or video files in any other suitable format. The response may also include text entered into the input field and/or other files attached to the message such as a PDF, DOC, or other file format.

Figure 4:
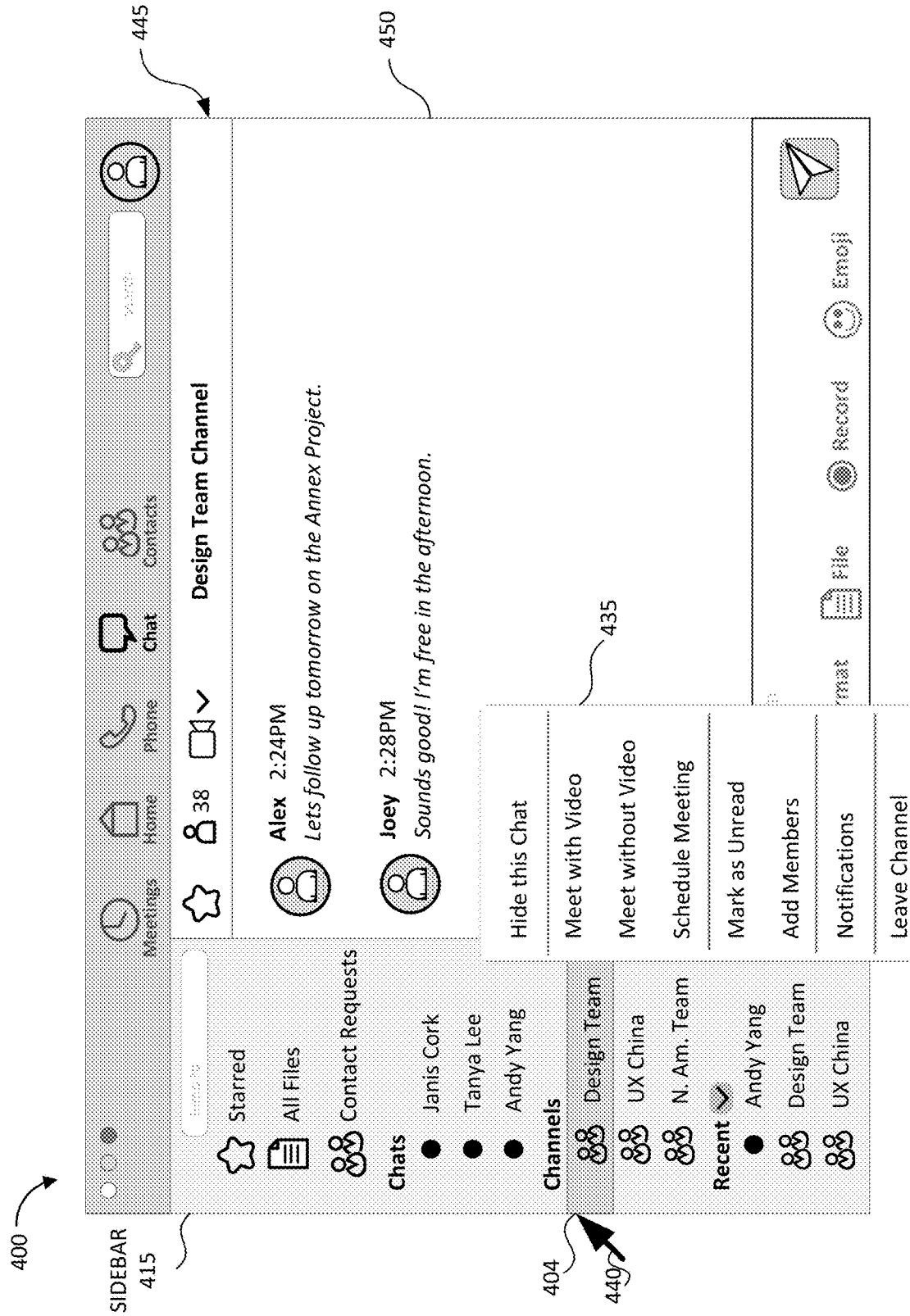
FIG. 4 shows a master chat panel with a menu, according to certain examples.

FIG. 4 shows a master chat panel 400 with a menu, according to certain examples. The master chat panel 400 may be similar to the master chat panel 300. Thus, even where not specified. The master chat panel 400 may include at least those components described in relation to FIG. 3.

The master chat panel 400 may include menus 435. The menu 435 may include one or more buttons, which add functionality to the messages in the chat channels and/or the chat channels themselves. The menu 435 may be displayed in response to a user request on the client device. In the illustrated example, the user may have requested the menu 435 associated with a design team chat channel 404. The user may have requested the menu 435 from the client device using the cursor 440. In some examples, mousing over a channel may cause the menu 435 to be displayed. In other examples, the menu 435 may be displayed in response to another user input (e.g., a right-click on the mouse while hovering over the design team chat channel 404). In other examples, the menu 435 may be displayed by a user input occurring in another space rather than the design team chat channel 404. For example, the menu 435 may be brought up by an input in a blank space of a chat window 450. One of ordinary skill in the art would recognize many different possibilities.

The menu 435 may include options associated with a chat channel. Those options may include starting a video conference (or "meeting"), scheduling a meeting, adding or removing members from the chat channel, changing setting associated with notifications sent to the client device, no longer displaying the chat channel in sidebar 415, and other such options. In some examples, the menu 435 may include options for a specific chat within the chat channel. For example, the menu 435 may include an option to mark a message as unread.

Although the menu 435 is illustrated as being opened from the design team chat channel 404 on the sidebar 415, the menu 435 may be opened from elsewhere. The menu 435 may display the same functions or different functions depending on where it is opened. For example, there may be a button on the chat control dashboard 445 that causes the client device to open the menu 435. Opening the menu 435 from the chat control dashboard 445 may only display functions related to a video meeting, for example. Functions related to a specific message in the chat may only be displayed in the menu 435 if the client device receives a user input on the specific message.

Figure 5:
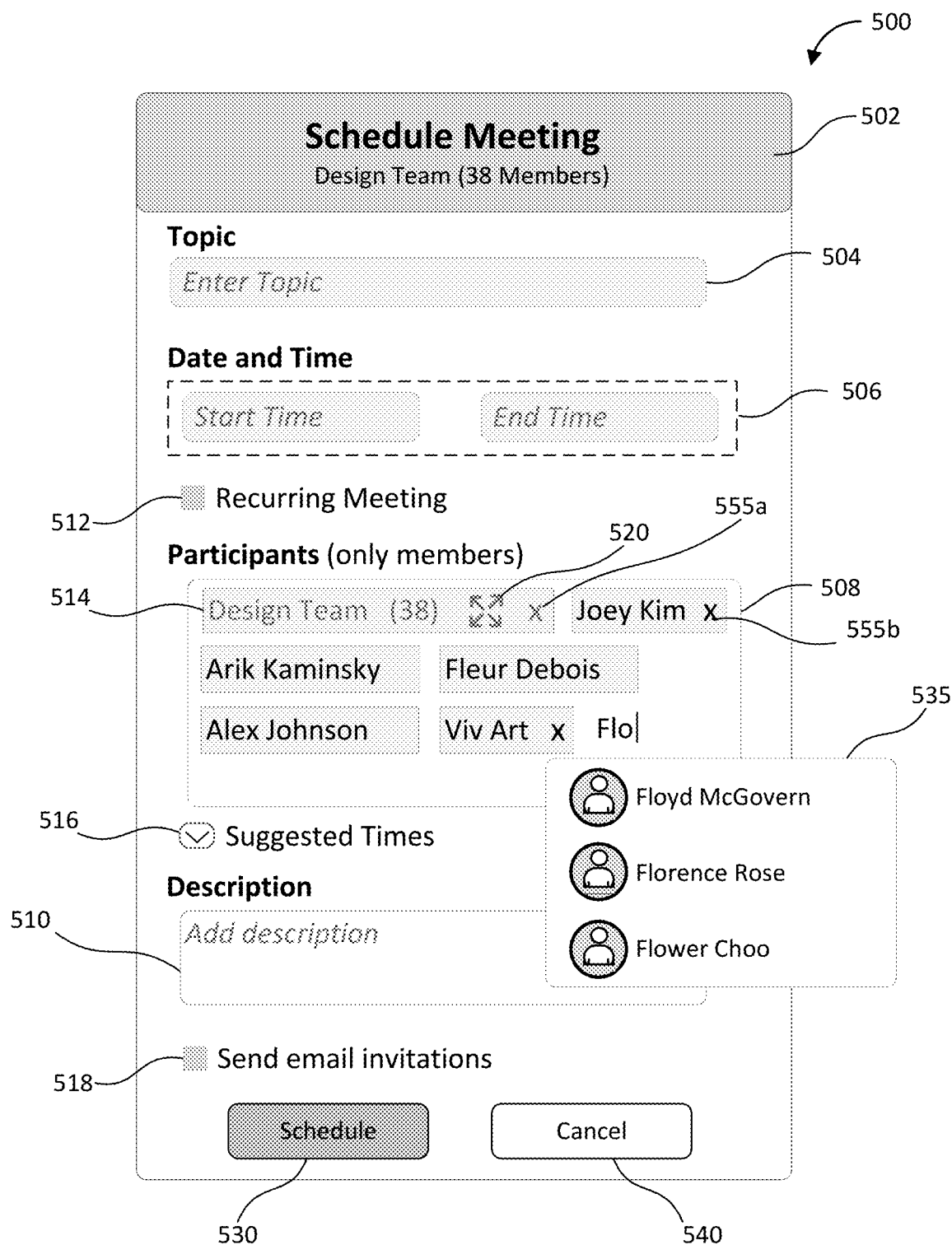
FIG. 5 shows a meeting scheduler for scheduling a meeting from a chat channel, according to certain examples.

FIG. 5 shows a meeting scheduler 500 for scheduling a meeting from a chat channel, according to certain examples. This example meeting scheduler 500 may be activated from within a chat channel that a user is engaged with. For example, if the user and other channel participants are discussing something via chat, the user may decide that a meeting would be more efficient. They can then invoke the meeting scheduler functionality to access the meeting scheduler 500 within the context of the channel. The user can then interact with the meeting scheduler 500 to schedule a meeting and post it to the channel for the other channel participants.

The meeting scheduler 500 may include a meeting information dashboard 502, and one or more customization fields such as a topic field 504, a date and time field 506, a participant field 508, and a description field 510. The meeting scheduler 500 may also include one or more option fields, such as recurrence field 512, a suggested time field 516, and an email invite field 518. The meeting scheduler may also include a schedule button 530 and a cancel button 540. While specific customization fields, option fields, and buttons (such as the schedule button 530 and the cancel button 540) are illustrated, other options may also be possible. For example, there may be a customization field such as a title field that allows a user to input a different title for the meeting. One of ordinary skill in the art would realize many different possibilities and configurations.

In some examples, the information included on the meeting information dashboard 502 may be determined by the client device. For example, if the menu 435 in the master chat panel 400 was opened from the design team chat channel 404, the client device may determine a number of participants having access to the design team chat channel, a proposed title to the meeting, and then display the information on the client device via the meeting scheduler 500. In other examples, the client device may send a request to the chat and video conference provider for the information. The chat and video conference provider, in response to the request, may transmit the requested information to the client device to cause the display of the requested information on the meeting information dashboard 502.

The meeting scheduler 500 may include one or more customization fields 504-510. The topic field 504 may provide for a topic of the meeting being scheduled using the meeting scheduler 500. The topic field 504 may allow the user to input a topic or other information in to the field using an input device such as a keyboard, mouse, or other appropriate device. In other examples, the topic field 504 may be auto-populated by the client device and/or the chat and video conference provider. For example, the client device and/or the video conference provider may determine a suggested topic from one or more chats within the chat channel. The suggested topic may then be displayed in the topic field 504.

The date and time field 506 may be displayed in the meeting scheduler 500 as blank. The date and time field 506 may include a field for a start time, an end time, a meeting duration, and a meeting date (not all pictured in FIG. 5). In some examples, all of these fields may be blank. In other examples, the client device may determine one or more suggestions for one or more of the fields within the date and time field based on certain parameters. For example, the client device may auto-populate a date field based on data gathered from the client device and/or the chat and video conference provider. The data may include data used to generate options for the suggested times field 516, described in detail below. Similarly, the start time field may be auto-populated by the client device based on a predetermined amount of time from the activation of the meeting scheduler 500. For example, the start time may be one hour from a time the meeting scheduler 500 was activated.

The participant field 508 may include a chat channel entry 514. The chat channel entry 514 may be auto-populated by the client device based on the location of the user input that activated the meeting scheduler (e.g., the menu 435 being opened from a chat channel in the master chat panel 400 in FIG. 4). The client device may designate all of the users associated with the chat channel entry 514 as required participants in the future meeting. The chat channel entry 514 may include an expand button 520 and a remove button 555a.

In some examples, the scheduling user may not require all of the chat channel participants to attend the meeting. As such, the scheduling user may remove one or more of the chat channel participants from the participant field 508. To remove a chat channel participant from the participant field 508, the scheduling user may select the expand button 520. In response to an input corresponding to the expand button 520, the client device may auto-populate the participant field 508 with all users associated with the chat channel. Each of the users in the participant field 508 may have an associated remove button 555b. In response to a user input corresponding with the remove button 555b, the client device may remove that associated user from the participant field 508. Any participant that is removed from the participant field 508 may be designated as an optional participant for the future meeting. Optional participants may still receive a meeting notification, as described below in FIG. 6.

In response to a user input corresponding to the remove button 555*a*, all users associated with the chat channel entry 514 may be removed from the participant field 508 and thus designated as optional attendees. The client device may then accept a user input in the participant field 508 to add a user associated with the chat channel to the participant field 508. The client device may access a database of users associated with the chat channel in response to an input in the participant field. The database may be stored on the client device, or the client device may access the database via communication with the chat and video conference provider. For example, the user may begin to enter characters into the participant field. The client device may then access the database of users and suggest a list 535 of possible names based on the characters already entered, generating a list of possible users to include in the participant field 508. The user may then select a name from the list 535 where the client device then adds the name to the participant list. A finalized participant list may be generated from all the users in the participant field 508 once the meeting is scheduled. All users included in the finalized participant list may be designated as required participants for the future meeting.

The meeting scheduler 500 may include the description field 510. The description field 510 may allow for the user to input a topic or other information in to the field using an input device such as a keyboard, mouse, or other appropriate device. In some examples, the description field 510 may be auto-populated by the client device and/or the chat and video conference provider. For example, the client device and/or the video conference provider may determine a suggested topic from one or more chats within the chat channel. The suggested topic may then be displayed in the description field 510. The suggested topic may be edited by inputs made by the user on the client device. In other examples, the description field 510 may not be auto-populated. Instead, the description field 510 may be displayed in the meeting scheduler 500 as blank, thereby allowing a user to insert the meeting information.

The client device may also display the recurrence field 512 on the meeting scheduler 500. The recurrence field 512 may be able to accept an input from the client device. In response to the input, the client device may store data associated with the future meeting that causes one or more similar meetings to be scheduled according to a predetermined periodicity. In some examples, in response to the input from the client device, the recurrence field 512 may cause another menu to be generated on the client device, where the user may enter the predetermined periodicity. In other examples, the client device and/or the chat and video conference provider may auto-populate the other menu with a suggested periodicity (e.g., weekly, monthly, etc.).

The client device may display the suggested time field 516. In response to the user input that generated the meeting scheduler 500, the client device may send a request to the chat and video conference provider such as the chat and video conference provider 110 in FIG. 1 for one or more parameters associated with users of the chat channel. The one or more parameters may include calendar information for each of the users of the chat channel, a time zone associated with each of the users of the chat channel, and other relevant scheduling information. Based on one or more of these parameters, a suggested time for the future meeting may be provided via the suggested time field 516. For example, a date and time for the future meeting may be suggested via the suggested time field 516 based on the calendar availability of the participants listed in the participant field 508.

The chat and video conference provider may in turn send a request for the one or more parameters to one or more user devices associated with each of the users of the chat channel. The one or more user devices may then send the requested parameters to the chat and video conference provider. In some examples, the user devices may have the requested parameters stored locally and send the requested parameters to the chat and video conference provider without user intervention. In other examples, the user device may prompt an associated user for input to determine the requested parameters or to authorize sending the requested parameters.

The chat and video conference provider may then utilize the one or more parameters received from the one or more user devices to determine a suggested time and transmit information causing the client device to generate a display of the suggested time in the meeting scheduler 500. In other examples, the chat and video conference provider may receive regular signals from the one or more user devices including information associated with the one or more parameters. The chat and video conference provider may then store the one or more parameters in a non-transitory memory device. Thus, when the client device sends a request for the one or more parameters to the chat and video conference provider, the chat and video conference provider may access the one or more parameters from the non-transitory memory device and send the parameters to the client device.

The client device may temporarily store the information and data entered into the meeting scheduler 500. The information and data may include information entered by the user and/or received from the chat and video conference provider such as a topic in the topic field 504, a meeting start time in the date and time field 506, the suggest time from the suggested time field 516, a required or not-required designation for each of the users in the participant field 508, etc. This list is not limiting; any data entered into the meeting scheduler may be stored by the client device.

The cancel button 540 may accept an input made by a user on the client device. In response to the input, the client device may clear all or some of the information and data associated with the future meeting. The client device may also close the meeting scheduler 500 and generate a previous display, displayed on the client device prior to the meeting scheduler 500.

The schedule button 530 may accept an input made by the user on the client device. In response to the input, the client device may cause the information and data associated with the future meeting to be sent to the chat and video conference provider. The chat and video conference provider may cause the future meeting to be scheduled by creating a meeting as is described in relation to FIGS. 1 and 2. The chat and video conference provider may update the one or more parameters stored at the chat and video conference provider for each of the users of the chat channel with the information and data associated with the future meeting. The chat and video conference provider may place a meeting invitation on a calendar associated with each of the users of the chat channel. In some examples, the chat and video conference provider may send the information and data to the one or more user devices associated with the users of the chat channel. The client device may also close the meeting scheduler 500, thereby providing the previous display, for example the master chat panel 400.

In some examples, the future meeting may be a video conference. The video conference may be hosted by the chat and video conference provider. Alternatively, the video conference may be hosted by a third-party provider. In either case, the client device, in response to the schedule button 530 being selected, may send a signal to the chat and video conference provider that causes the video conference to be scheduled, either at the chat and video conference provider or with the third-party provider.

Figure 6:
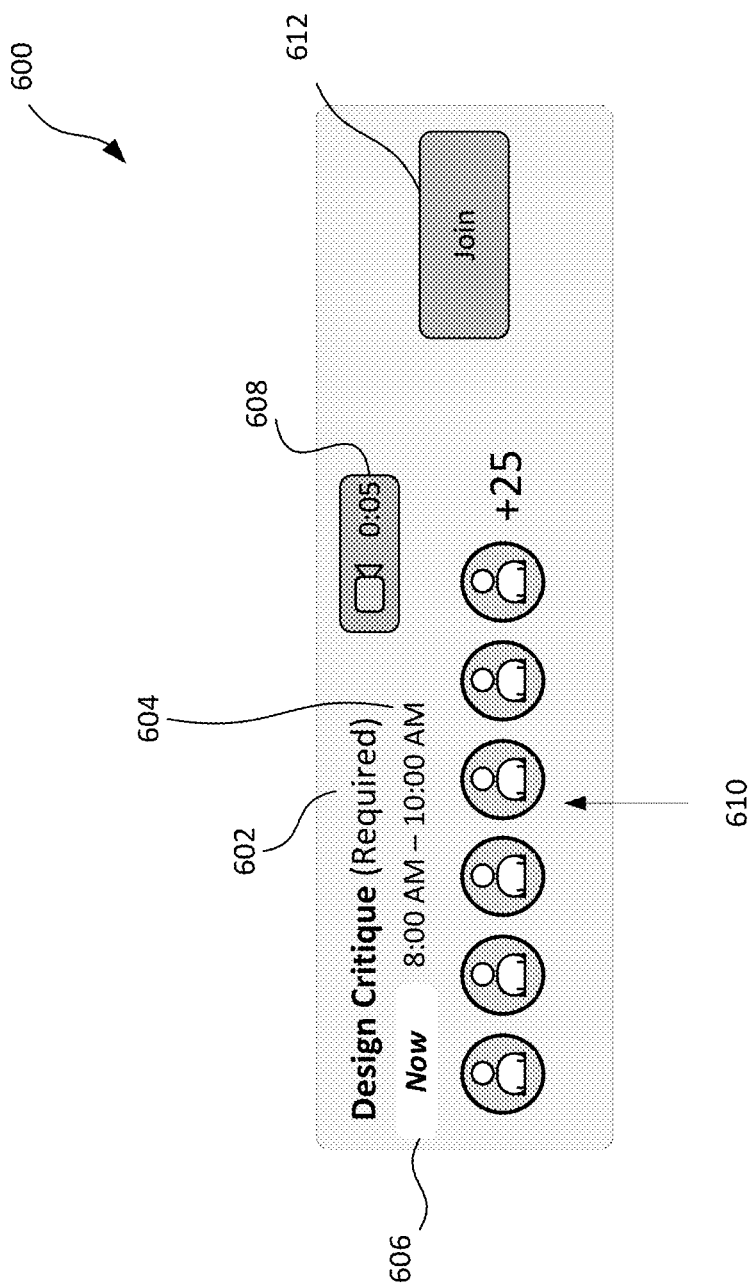
FIG. 6 shows a meeting notification, according to examples.

FIG. 6 shows a meeting notification 600, according to examples. The meeting notification 600 may include a required notification 602, a meeting duration time 604, a meeting scheduled time 606, a meeting elapsed time 608, a participant list 610, and a join button 812. The meeting notification 600 may be displayed on a client device. The client device may receive information from the chat and video conference provider that causes the meeting notification 600 to be displayed on the client device, where the information included on the meeting notification is unique to a user associated with the client device. In other words, all users of a chat channel may receive a unique meeting notification 600 including a required participant notification or an optional participant notification. The meeting notification 600 may be generated using the information and data gathered as part of the meeting scheduler 500 in FIG. 5.

The meeting notifications 600 may also cause the client device to add the respective meetings to the user's calendar. The meeting notifications 810a-b may also cause the client device to add an associated meeting to the user's calendar. For example, the associated meeting may occur sometime in the future. The client device may access a date and start time of the second meeting and add an entry to a calendar associated with the user. In some examples, this calendar may be used to generate the one or more parameters used to schedule a meeting.

The required notification 602 may be generated from the information and data gathered from the meeting scheduler 500 in FIG. 5. This may include calendar information or other relevant data. In the example illustrated in FIG. 6, the meeting notification 600 shows the user as being required to attend the meeting. In other examples, such as if a calendar conflict exists between the meeting scheduled time 606 and another event on the users calendar, the required notification 602 may read "Optional." In some examples, the required notification 602 may read optional for all participants. The meeting notification may then require an acceptance by a participant in order to add the meeting on the participant's calendar.

The meeting duration time 604 may display a start and end time for the meeting, as is illustrated in FIG. 6. The meeting duration time 604 may also display a duration for the meeting. For example, the meeting duration time 604 shows the meeting as occurring between 8:00 am and 10:00 am. In addition to or instead of displaying the meeting start and end times, the meeting duration time 604 may display "2 hours" in this case.

The meeting scheduled time 606 may display information pertaining to the start time and/or date of the meeting. For example, as shown in FIG. 6, the meeting associated with the meeting notification 600 may have already began. Thus, the meeting scheduled time displays "now," indicating that the meeting is occurring. In other examples, the meeting scheduled time 606 may display different information. For example, if the meeting is scheduled to occur at a later date, the meeting scheduled time may display a date the meeting is to occur on, as well as the start time of the meeting. In other examples, the meeting scheduled time may only appear within a predetermined time of the meeting start time. One of ordinary skill in the art would recognize many different possibilities and configurations.

The meeting elapsed time 608 may display a time count beginning from the start time of the meeting. For example, in FIG. 6, the meeting elapsed time 608 is shown as having five seconds elapsed. This may mean that the meeting began five seconds ("0:05") ago. If the meeting had started 30 minutes ago, the meeting elapsed time 608 may display "30:00." If the meeting had not started yet, the meeting elapsed time 608 may read 0:00. In some examples where the meeting had not started yet, the meeting notification 600 may not include the meeting elapsed time 608.

The meeting notification 600 may include the participant list 610. The participant list 610 may include one or more avatars, each associated with a user invited to the meeting. In some examples, information such as a name of the user may displayed on the client device in response to a user input. For example, the user may cause a mouse to move over one of the avatars in the participant list 610. The client device may then display the name of the avatar. In some examples, the meeting associated with the meeting notification 600 may have already begun. In that case, the participant list 610 may only show users that have joined the meeting instead of all users invited to the meeting.

The meeting notification 600 may also include the join button 612. The join button 612 may include a link that, in response to a user input, joins the client device to the meeting. In some examples, the client device may join the meeting as is described in relation to the system 200 in FIG. 2.

Figure 7:
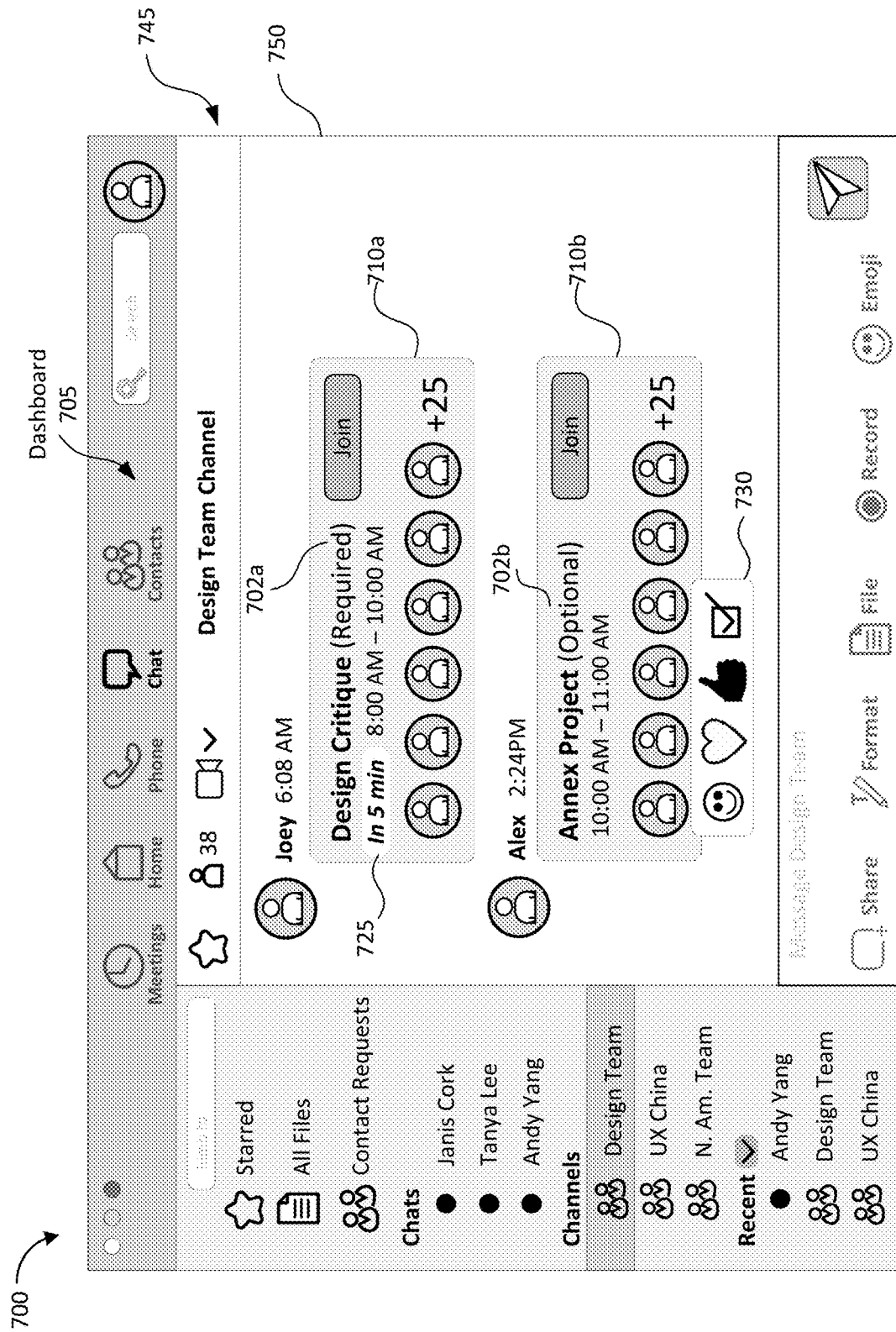
FIG. 7 shows a master chat panel with multiple meeting notifications associated with a chat channel, according to certain examples.

FIG. 7 shows a master chat panel 700 with multiple meeting notifications associated with a chat channel, according to certain examples. The master chat panel 700 may be similar to the master chat panel 400, described in FIG. 4. As such, the master chat panel 700 may have the same components and functionalities of the master chat panel 400.

The master chat panel 700 may display all chats and meeting notifications within a specific chat channel. In the present example, the specific chat channel may be the "Design team Channel," as displayed in a chat control dashboard 745. The chat window 750 may display meeting notifications 710a-b, where each of the meeting notifications 710a-b correspond to a different meeting. Although only two meeting notifications 710a-b are shown, any number of meeting notifications may be shown.

The meeting notifications 710a-b may be provided to the chat channel by the chat and video conference provider. The meeting notifications 710a-b may be unique to the user associated with the client device, meaning other users of the chat channel may have different meeting notifications posted in their respective view of the chat channel for the same associated meetings.

For example, the meeting notification 710a may correspond to a first meeting. The first meeting may have a meeting start time that begins in five minutes, as is shown by a meeting scheduled time 725. Furthermore, a required designation 702a shows the user as being a required participant. By contrast, the meeting notification 710b may correspond to a second meeting. The meeting notification 710b may not include a meeting scheduled time, indicating that; there is more time until the meeting start time than a predetermined time between the current time and the meeting start time. The meeting notification 710b also may include a required designation 702b showing the user as an optional participant. The required designation 702b may show the user as an optional participant due to one or more parameters received by the chat and video conference provider. In some embodiments, the meeting notifications 710a-b may include an invite, where acceptance of the meeting is required. After a user accepts the meeting notification, the meeting may be scheduled on the users calendar. If the user denies the meeting, the meeting may not be scheduled on the user's calendar, but may remain in the chat channel.

The meeting notifications 710a-b may also include a reaction panel 730. In some examples, the reaction panel may only be displayed in response to a user input on the client device. The reaction panel 730 may include one or more buttons that cause an image file, audio file, and/or other electronic file to be sent to the chat channel. For example, the reaction panel 730 may have a "like" button that, in response to a user input corresponding to the like button, causes an emoji to be sent to the chat channel.

Figure 8:
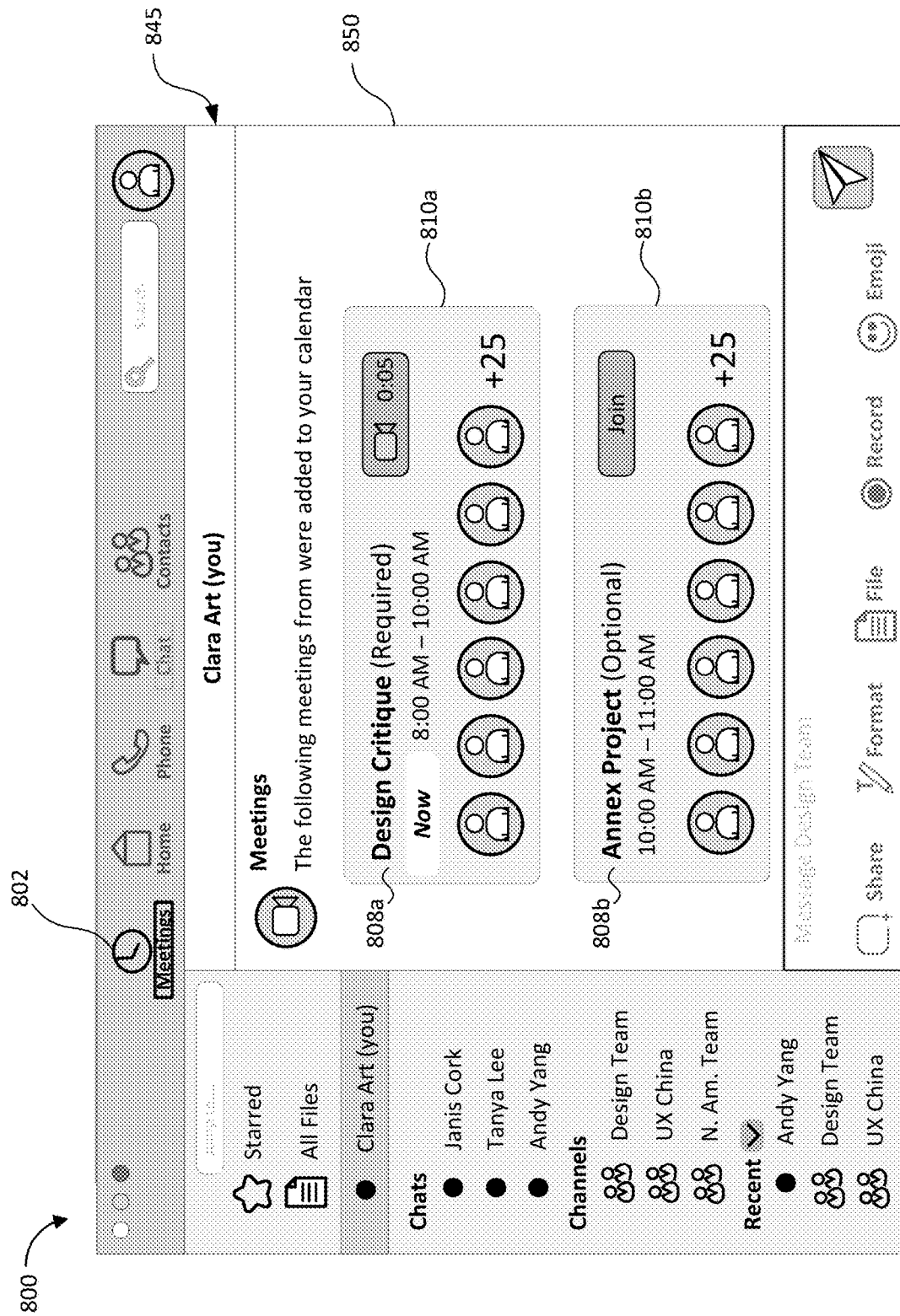
FIG. 8 shows a master chat panel with multiple meeting notifications from different chat channels, according to examples.

FIG. 8 shows a master chat panel 800 with multiple meeting notifications from different chat channels, according to examples. The master chat panel 800 may be similar to the master chat panel 400 as described in FIG. 4. The master chat panel 800 may also be similar to the master chat panel 700 as described in FIG. 7, but showing a different view or panel.

The master chat panel 800 may display all meeting notifications directed at a user associated with a client device displaying the master chat panel 800. The master chat channel 800 may be displayed in response to a user input corresponding to a meeting button 802. A chat control dashboard 845 may display a name of the user, indicating that the user is not viewing any chat channel, but instead is viewing all meeting notifications directed towards the user. In other words, the master chat panel 800 may determine that there are multiple meeting notifications from multiple chat channels, and display all the meeting notifications on one page through which the user may scroll to view each of the meeting notifications.

A chat window 850 may display the meeting notifications 810a-b. The meeting notifications 810a-b may be similar to the meeting notification 600 in FIG. 6 and/or the meeting notifications 710a-b in FIG. 7. Therefore, components not labelled in FIG. 8 may still be included in the meeting notifications 810a-b. The meeting notifications 810a-b may be associated with different meetings and/or associated with a different chat channel. The user may be associated with the different chat channels, however, and thus receive the meeting notifications 810a-b.

The meeting notification 810a may be associated with a first meeting. The first meeting may be associated with a first chat channel, displayed on the meeting notification 810a by a channel indicator 808a. The meeting notification 810b may be associated with a second meeting. The second meeting may be associated with a second chat channel, displayed on the meeting notification 810b by a channel indicator 808b. In some examples, the chat channels associated with the meeting notifications 810a-b may be the same. The channel indicators 808a-b may therefore display the same chat channel names.

The meeting notifications 810a-b may also remain displayed in the chat channel even after the associated meeting is over. The user may access the meeting notifications 810a-b to see which participants were required or optional, a topic of the associated meeting, how long the associated meeting lasted, and other information. In some examples, the associated meeting may have been recorded and stored by the chat and video conference provider. The meeting notifications 810a-b may then include a link that causes a request to be sent to the chat and video conference provider for the recording of the associated meeting. The chat and video conference provider may then transmit the recording of the associated meeting to the client device.

The meeting notifications 810a-b may also cause the client device to add the respective meetings to the user's calendar. For example, the second meeting may occur sometime in the future. The client device may access a date and start time of the second meeting and add an entry to a calendar associated with the user. In some examples, this calendar may be used to generate the one or more parameters used to schedule a meeting.

Figure 9:
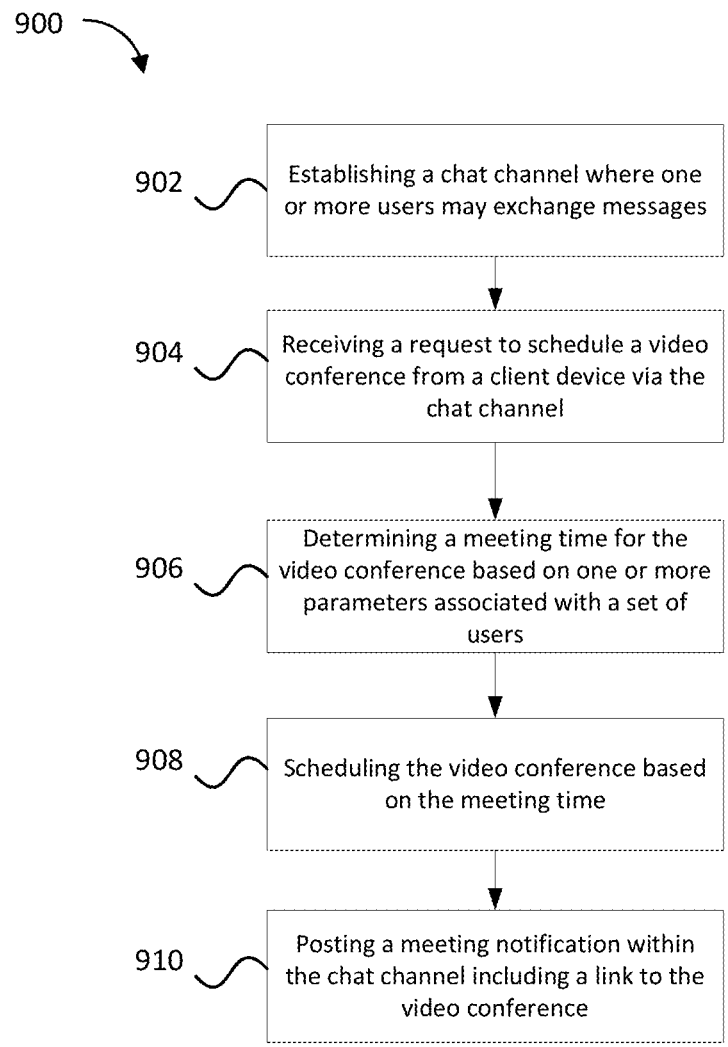
FIG. 9 shows a flowchart of a method for scheduling a meeting within a chat channel, according to examples.

FIG. 9 shows a flowchart of a method for scheduling a meeting within a chat channel, according to examples. The method 900 may be performed by any of the systems disclosed herein, such as the system 100 in FIG. 1 and the system 200 in FIG. 2. At 902, a chat channel is established, where one or more users may exchange messages via the chat channel. The one or more users may access the chat channel using a respective client device. In some examples, the chat channel may be established by a chat and video conference provider, as is described in relation to FIGS. 1 and 2. In some examples, more than one chat channel may be established. The chat channels may be displayed on the respective client device in a master chat panel, such as the master chat panel 400 in FIG. 4.

At 904, the video conference provider may receive a request to schedule a video conference from a first client device. The client device may send the request to the chat and video conference provider via the chat channel. In some examples, the request may be sent by the client device in response to a menu such as menu 435 opened from the master chat panel 400 in FIG. 4.

At 906, a meeting time for the video conference may be determined using one or more parameters. The parameters may be associated with a set of users having access to the chat channel. The one or more parameters may include a time zone, a calendar availability, and other relevant scheduling information associated with each user of the set of users. The first client device may send a request to the chat and video conference provider for one or more parameters associated with the set of users.

The chat and video conference provider may in turn send a request for the one or more parameters to one or more user devices associated with each of the users of the chat channel. The one or more user devices may then send the requested parameters to the chat and video conference provider. The chat and video conference provider may then utilize the one or more parameters received from the one or more user devices to determine a suggested time and transmit information causing the client device to generate a display of the suggested time in a meeting scheduler, such as the meeting scheduler 500 described in FIG. 5. In some examples, the suggested time may be determined by identifying an open block of time on a majority of the participants' calendars. The open block of time may be required to be within a certain period (e.g., business hours on a weekday). In other examples, the suggested time may correspond to an open block of time on a select group of participants (e.g., team leaders). Other relevant information may be used to determine a suggested time.

In other examples, the chat and video conference provider conference may receive regular signals from the one or more user devices including information associated with the one or more parameters. For example, the one or more user devices may gather information corresponding to their respective users (e.g., calendar information) and provide the information to the chat and video provider at a regular interval (e.g., one-minute intervals, thirty-minute intervals, etc.) The chat and video conference provider may then store the one or more parameters in a non-transitory memory device. Thus, when the first client device sends a request for the one or more parameters to the chat and video conference provider, the chat and video conference provider may access the one or more parameters from the non-transitory memory device and send the parameters to the first client device. The chat and video conference provider and/or the first client device may then determine a suggested meeting time. In some examples, the suggested time may be determined by identifying an open block of time on a majority of the participants' calendars. The open block of time may be required to be within a certain period (e.g., business hours on a weekday). In other examples, the suggested time may correspond to an open block of time on a select group of participants (e.g., team leaders).

In some examples, the meeting scheduler is transmitted from the chat and video conference provider that requests meeting information for the video conference. The meeting information may include a topic and a participant list. Portions of the meeting information requested in the meeting scheduler may be auto-populated by the client device and/or the chat and video conference provider.

For example, the participant list may be auto-populated based on the set of users associated with the chat channel. The client device, based on a user input, may remove one or more of the auto-populated participants in the participant list, then send an indication of the removed participants to the chat and video conference provider. The removed participants may be designated as optional participants for the video conference. The client device may then generate a finalized participant list. The participants in the finalized participant list may be designated as required participants for the video conference. The topic may be similarly generated, using one or more messages in the chat channel. In some examples, no topic may be suggested, and the client device may generate a topic based on a user input. The chat and video conference provider may then receive the meeting information for the video conference from the client device.

At 908, the video conference may be scheduled by the chat and video conference provider based on the meeting information. In some examples, the chat and video conference provider schedules the video conference utilizing systems such as the system 100 in FIG. 1 and the system 200 in FIG. 2. In other examples, the video conference may be scheduled using a separate video conference provider. In that case, the chat and video conference provider may communicate with a system of the separate video conference provider to schedule the video conference.

At 910, the chat and video conference provider may post a meeting notification in the chat channel. The meeting notification may be similar to the meeting notification 600 in FIG. 6 and may include a link that allows the first client device to join the video conference. The chat and video conference provider may also transmit the meeting notification to a second client device. The meeting notification transmitted to the second client device may be characterized by one or more parameters associated with the second client device. In other words, all users of a chat channel may receive a version of the meeting notification on their respective second client devices via the chat channel, where the information included in the meeting notification is unique to that user.

In some examples, the chat and video conference provider and/or a client device associated with a user may provide information to generate a listing of meeting notifications associated with video conferences scheduled in the chat channel. For example, in FIG. 7, the master chat panel 700 may display multiple meeting notifications for meetings scheduled within the "Design Team" channel. In other examples, the chat and video conference provider and/or the client device associated with the user may provide information to generate a listing of meeting notifications unique to that user. For example, the master chat panel 800 in FIG. 8 may display multiple meeting notifications that are directed to one user (here, "Clara Art"). In other words, the client device may aggregate all chat channels and display meeting notifications from multiple channels in one chat window, such as the chat window 850.

Figure 10:
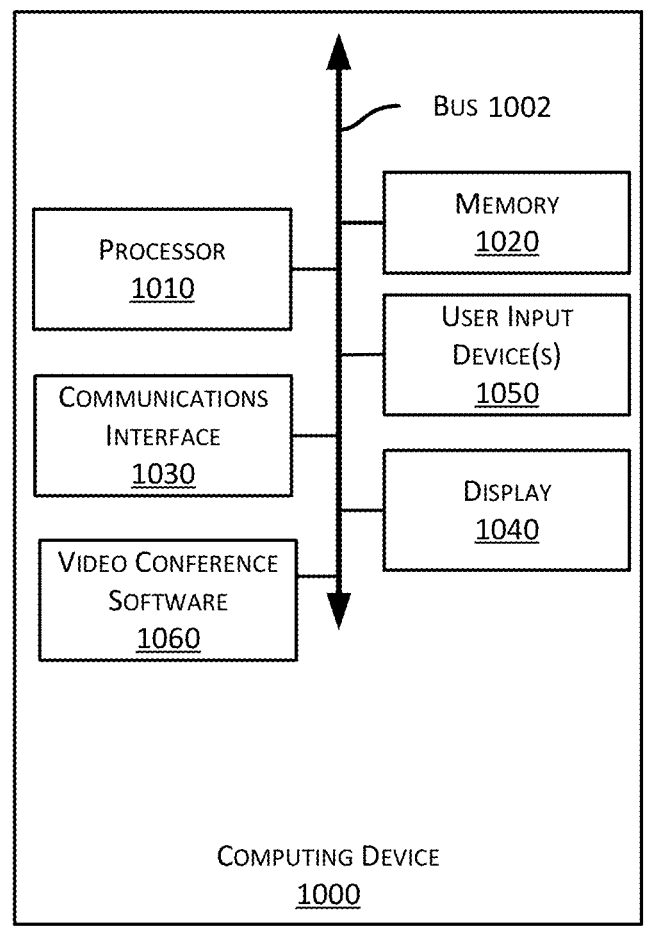
FIG. 10 shows an example computing device 1000 suitable for use in example systems or methods for scheduling a meeting from a chat channel, according to certain examples.

FIG. 10 shows an example computing device 1000 suitable for use in example systems or methods for scheduling a meeting from a chat channel, according to certain examples. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for scheduling a meeting from a chat channel, such as part or all of the example method 900, described above with respect to FIG. 9. The computing device, in this example, also includes one or more user input devices 1050, such as a keyboard, mouse, touchscreen, video input device (e.g., one or more cameras), microphone, etc., to accept user input. The computing device 1000 also includes a display 1040 to provide visual output to a user.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 may include a system with a non-transitory computer-readable medium; a communications interface; and a processor communicatively coupled to the non-transitory computer-readable medium and the communication interface, the processor configured to execute processor executable instructions stored in the non-transitory computer-readable medium. The instructions may cause the processor to receive, from a first client device via a chat channel, a request to schedule a video conference. The chat channel may be configured to enable one or more users to exchanges messages using a respective client device. The processor may further determine a meeting time for the video conference based on one or more parameters associated with a set of users having access to the chat channel. The processor may further schedule the video conference based on the meeting time. The processor may further post, within the chat channel, a meeting notification, where the meeting notification includes a link to the video conference.

Example 2 is the system of any previous or subsequent example, where the one or more parameters includes at least one of a time zone associated with each of users of the set of users or a calendar availability associated with each user of the set of users.

Example 3 is the system of any previous or subsequent example, where the one or more parameters associated with each user of the set of users are received from one or more respective client devices and stored on the non-transitory computer-readable medium and used to generate a suggested time.

Example 4 is the system of any previous or subsequent example, where the processor executable instructions to receive, from the first client device via the chat channel, the request to schedule the video conference, are further configured to cause the processor to transmit, to the first client device via the chat channel, a meeting scheduler where the meeting scheduler requests meeting information for the video conference, including a topic for the video conference and a participant list. The processor may further auto-populate the participant list in the meeting scheduler based on the set of users associated with the chat channel. The processor may further receive, from the first client device, an indication to remove one or more participants associated with the set of users from the participant list; designate the one or more participants removed from the participant list as optional participants for the video conference. The processor may further receive, from the first client device via the meeting scheduler, a finalized participant list, where the finalized participant list includes one or more participants associated with the set of users. The processor may further designate the one or more participants in the finalized participant list as required participants for the video conference.

Example 5 is the system of any previous or subsequent example, where the processor executable instructions to post, within the chat channel, a meeting notification, further causes the processor generate a unique meeting notification for each of the set of users. Each unique meeting notification may include a required participant notification or an optional participant notification.

Example 6 is the system of any previous or subsequent example, the processor executable instructions to schedule the video conference based on the meeting time further causes the processor to transmit, to a video conference provider, a signal to schedule the video conference. The processor may further receive, from the video conference provider, the link to the video conference.

Example 7 is the system of any previous or subsequent example where the system provides instructions to cause the one or more client devices to display, in the chat channel, a listing of video conferences scheduled in the chat channel.

Example 8 is the system of any previous or subsequent example where the system transmits, to a second client device, the meeting notification. The meeting notification is characterized by one or more parameters associated with the second client device.

Example 9 is the system of any previous or subsequent example where the meeting notification includes a meeting duration time or a meeting elapsed time after the video conference has started.

Example 10 is a method for scheduling a meeting within a chat channel, the method may include establishing a chat channel, where the chat channel is configured to enable one or more users to exchange messages using a respective client device. The method may also include receiving, from a first client device via the chat channel, a request to schedule a video conference. The method may further include determining a meeting time for the video conference based on one or more parameters associated with a set of users having access to the chat channel. The method may also include scheduling the video conference based on the meeting time. The method may further include posting, within the chat channel, a meeting notification, where the meeting notification includes a link to the video conference.

Example 11 is the method of any previous or subsequent example, where determining a meeting time further includes transmitting, to the first client device via the chat channel, a meeting scheduler, where the meeting scheduler requests meeting information for the video conference. The meeting information may further include a topic for the video conference and a participant list. The method may include auto-populating the participant list in the meeting scheduler based on the set of users associated with the chat channel. The method may include receiving, from the first client device, an indication to remove one or more participants associated with the set of users from the participant list. The method may further include designating the one or more participants removed from the participant list as optional participants for the video conference. The method may also include receiving, from the first client device via the meeting scheduler, a finalized participant list, where the finalized participant list includes one or more participants associated with the set of users. The method may also include designating the one or more participants in the finalized participant list as required participants for the video conference.

Example 12 is the method of any previous or subsequent example, where scheduling the video conference further includes transmitting, to a video conference provider, a signal to schedule the video conference. The method may further include and receiving, from the video conference provider, the link to the video conference.

Example 13 is the method of any previous or subsequent example, where posting a meeting notification further includes generating a meeting notification for each of the set of users, where each meeting notification includes a required participant notification or an optional participant notification.

Example 14 is the method of any previous or subsequent example, where the one or more parameters includes at least one of a time zone associated with each of users of the set of users or a calendar availability associated with each user of the set of users.

Example 15 is the method of any previous or subsequent example, where the one or more parameters associated with each user of the set of users are received from one or more respective client devices and stored on a non-transitory computer-readable medium.

Example 16 is a non-transitory computer-readable medium including processor-executable instructions configured to cause one or more processors to establish a chat channel, where the chat channel is configured to enable one or more users to exchange messages using a respective client device The processors may be further configured to receive, from a first client device via the chat channel, a request to schedule a video conference. The processors may be further configured to determine a meeting time for the video conference based on one or more parameters associated with a set of users having access to the chat channel. The processors may be further configured to schedule the video conference based on the meeting time. The processors may be further configured to and post, within the chat channel, a meeting notification, where the meeting notification includes a link to the video conference.

Example 17 is the non-transitory computer-readable medium of any previous or subsequent example including processor-executable instructions, where the one or more parameters includes at least one of a time zone associated with each of users of the set of users. The processors may be further configured to or a calendar availability associated with each user of the set of users.

Example 18 is the non-transitory computer-readable medium of any previous or subsequent example including processor-executable instructions, where the one or more parameters associated with each user of the set of users are received from one or more respective client devices and stored on the non-transitory computer-readable medium.

Example 19 is the non-transitory computer-readable medium of any previous or subsequent example including processor-executable instructions, the processors further configured to: provide instructions to cause the one or more client devices to display, in the chat channel, a listing of video conferences scheduled in the chat channel.

Example 20 is the non-transitory computer-readable medium of any previous or subsequent example including processor-executable instructions, the processors further configured to transmit to a second client device, the meeting notification where the meeting notification is characterized by one or more parameters associated with the second client device.

What is claimed is:

1. A system comprising:
   a non-transitory computer-readable medium;
   a communications interface; and
   a processor communicatively coupled to the non-transitory computer-readable medium and the communication interface, the processor configured to execute processor executable instructions stored in the non-transitory computer-readable medium to:
   receive, by a chat provider from a first client device via a chat channel, a request to schedule a video conference, wherein the chat channel is configured to enable one or more users to exchanges messages using a respective client device;
   determine, by the chat provider, a meeting time for the video conference based on one or more parameters associated with a set of users having access to the chat channel;
   schedule, by the chat provider, the video conference based on the meeting time;
   post, by the chat provider within the chat channel, a meeting notification, wherein the meeting notification comprises a link to the video conference; and
   in response to a user associated with a second client device accessing the chat channel, provide, by the chat provider to the second client device, information associated with the meeting notification, the information comprising user-specific information associated with the user.

2. The system of claim 1, wherein the one or more parameters comprises at least one of:
a time zone associated with each of users of the set of users; or
a calendar availability associated with each user of the set of users.

3. The system of claim 1, wherein the one or more parameters associated with each user of the set of users are received from one or more respective client devices and stored on the non-transitory computer-readable medium and used to generate a suggested time.

4. The system of claim 1, wherein the processor executable instructions to receive, from the first client device via the chat channel, the request to schedule the video conference, are further configured to cause the processor to:
transmit, to the first client device via the chat channel, a meeting scheduler wherein the meeting scheduler requests meeting information for the video conference, comprising a topic for the video conference and a participant list;
auto-populate the participant list in the meeting scheduler based on the set of users associated with the chat channel;
receive, from the first client device, an indication to remove one or more participants associated with the set of users from the participant list;
designate the one or more participants removed from the participant list as optional participants for the video conference;
receive, from the first client device via the meeting scheduler, a finalized participant list, wherein the finalized participant list comprises one or more participants associated with the set of users; and
designate the one or more participants in the finalized participant list as required participants for the video conference.

5. The system of claim 1, wherein the processor executable instructions to post, within the chat channel, a meeting notification, further causes the processor to:
generate a unique meeting notification for each of the set of users, wherein each unique meeting notification comprises a required participant notification or an optional participant notification.

6. The system of claim 1, the processor executable instructions to schedule the video conference based on the meeting time further causes the processor to:
transmit, to a video conference provider, a signal to schedule the video conference; and
receive, from the video conference provider, the link to the video conference.

7. The system of claim 1 wherein the system provides instructions to cause the respective client devices to display, in the chat channel, a listing of video conferences scheduled in the chat channel.

8. The system of claim 1 wherein the system transmits, to a second client device, the meeting notification wherein the meeting notification is characterized by one or more parameters associated with the second client device.

9. The system of claim 1 wherein the meeting notification comprises a meeting duration time or a meeting elapsed time after the video conference has started.

10. A method for scheduling a meeting within a chat channel, the method comprising:
receiving, by a chat provider from a first client device via the chat channel, a request to schedule a video conference;
selecting, by the chat provider, a set of users to invite to the meeting, the set of users having access to the chat channel;
determining, by the chat provider, a meeting time for the video conference based on one or more parameters associated with a set of users having access to the chat channel;
scheduling, by the chat provider, the video conference based on the meeting time;
posting, by the chat provider within the chat channel, a meeting notification, wherein the meeting notification comprises a link to the video conference; and
in response to a user associated with a second client device accessing the chat channel, provide, by the chat provider to the second client device, information associated with the meeting notification, the information comprising user-specific information associated with the user.

11. The method of claim 10, wherein determining a meeting time further comprises:
transmitting, to the first client device via the chat channel, a meeting scheduler wherein the meeting scheduler requests meeting information for the video conference, comprising a topic for the video conference and a participant list;
auto-populating the participant list in the meeting scheduler based on the set of users associated with the chat channel;
receiving, from the first client device, an indication to remove one or more participants associated with the set of users from the participant list;
designating the one or more participants removed from the participant list as optional participants for the video conference;
receiving, from the first client device via the meeting scheduler, a finalized participant list, wherein the finalized participant list comprises one or more participants associated with the set of users; and
designating the one or more participants in the finalized participant list as required participants for the video conference.

12. The method of claim 10, wherein scheduling the video conference further comprises:
transmitting, to a video conference provider, a signal to schedule the video conference; and
receiving, from the video conference provider, the link to the video conference.

13. The method of claim 10, wherein posting a meeting notification further comprises:
generating a meeting notification for each of the set of users, wherein each meeting notification comprises a required participant notification or an optional participant notification.

14. The method of claim 10, wherein the one or more parameters comprises at least one of:
a time zone associated with each of users of the set of users; or
a calendar availability associated with each user of the set of users.

15. The method of claim 10, wherein the one or more parameters associated with each user of the set of users are received from one or more respective client devices and stored on a non-transitory computer-readable medium.

16. A non-transitory computer-readable medium comprising processor-executable instructions configured to cause one or more processors to:
- receive, by a chat provider from a first client device via a chat channel, a request to schedule a video conference;
- determine, by the chat provider, a meeting time for the video conference based on one or more parameters associated with a set of users having access to the chat channel;
- schedule, by the chat provider, the video conference based on the meeting time;
- post, by the chat provider within the chat channel, a meeting notification, wherein the meeting notification comprises a link to the video conference; and
- in response to a user associated with a second client device accessing the chat channel, provide, by the chat provider to the second client device, information associated with the meeting notification, the information comprising user-specific information associated with the user.

17. The non-transitory computer-readable medium of claim 16 comprising processor-executable instructions, wherein the one or more parameters comprises at least one of:
- a time zone associated with each of users of the set of users; or
- a calendar availability associated with each user of the set of users.

18. The non-transitory computer-readable medium of claim 16 comprising processor-executable instructions, wherein the one or more parameters associated with each user of the set of users are received from one or more respective client devices and stored on the non-transitory computer-readable medium.

19. The non-transitory computer-readable medium of claim 16 comprising processor-executable instructions, the processors further configured to: provide instructions to cause one or more client devices to display, in the chat channel, a listing of video conferences scheduled in the chat channel.

20. The non-transitory computer-readable medium of claim 16 comprising processor-executable instructions, the processors further configured to: transmit to a second client device, the meeting notification wherein the meeting notification is characterized by one or more parameters associated with the second client device.

* * * * *